United States Patent
Kazui

(10) Patent No.: US 10,448,034 B2
(45) Date of Patent: Oct. 15, 2019

(54) VIDEO IMAGE ENCODING DEVICE, VIDEO IMAGE CODING METHOD, VIDEO IMAGE DECODING DEVICE, VIDEO IMAGE DECODING METHOD, AND NON-TRANSITORY COMPUTER-READABLE STORAGE MEDIUM

(71) Applicant: FUJITSU LIMITED, Kawasaki-shi, Kanagawa (JP)

(72) Inventor: Kimihiko Kazui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 15/715,254

(22) Filed: Sep. 26, 2017

(65) Prior Publication Data

US 2018/0109800 A1    Apr. 19, 2018

(30) Foreign Application Priority Data

Oct. 17, 2016  (JP) .................................. 2016-203497

(51) Int. Cl.
*H04N 19/33* (2014.01)
*H04N 19/176* (2014.01)
(Continued)

(52) U.S. Cl.
CPC .......... *H04N 19/33* (2014.11); *H04N 7/0122* (2013.01); *H04N 19/132* (2014.11);
(Continued)

(58) Field of Classification Search
CPC .... H04N 19/33; H04N 19/176; H04N 19/137; H04N 19/44; H04N 19/186; H04N 7/0122
See application file for complete search history.

(56) References Cited

U.S. PATENT DOCUMENTS

2005/0259729 A1*  11/2005  Sun .................... H04N 19/33
                                                      375/240.1
2006/0013308 A1*   1/2006  Kim .................. H04N 19/186
                                                      375/240.16

(Continued)

FOREIGN PATENT DOCUMENTS

JP        2010-531609       9/2010
JP        2014-204338      10/2014

(Continued)

OTHER PUBLICATIONS

T. Lin et al, "Mixed Chroma Sampling-rate coding: combining the merits of 4:4:4 and 4:2:0 and increasing the value of past 4:2:0 investment", Joint Collaborative Team on Video Coding (JCT-VC) of ITU-T SG16 WP3 and ISO/IEC JTC1/SC29/WG11, Document: JCTVC-H0065, 8th Meeting, Feb. 1-10, 2012, pp. 1-6 (6 pages).

*Primary Examiner* — Neil R Mikeska
(74) *Attorney, Agent, or Firm* — Fujitsu Patent Center

(57) ABSTRACT

A video image decoding device executes a separation process for extracting, from encoded video image data including multiple images, first encoded data obtained by encoding reduced images of first images included in the multiple images, and second encoded data obtained by encoding second images included in the multiple images, executes a first decoding process for decoding the reduced images of the first images from the first encoded data, executes a second decoding process for decoding the second images from the second encoded data, executes a recording process that includes recording first region included in the reduced images, the first region including motions with respect to the second images immediately preceding the first images, and executes a synthesis process for reproducing the multiple (Continued)

images by modifying second region in the second images immediately preceding the first images in accordance with the first region.

8 Claims, 11 Drawing Sheets

(51) Int. Cl.
*H04N 7/01* (2006.01)
*H04N 19/44* (2014.01)
*H04N 19/186* (2014.01)
*H04N 19/137* (2014.01)
*H04N 19/30* (2014.01)
*H04N 19/132* (2014.01)
*H04N 19/27* (2014.01)

(52) U.S. Cl.
CPC ......... *H04N 19/137* (2014.11); *H04N 19/176* (2014.11); *H04N 19/186* (2014.11); *H04N 19/27* (2014.11); *H04N 19/30* (2014.11); *H04N 19/44* (2014.11)

(56) References Cited

U.S. PATENT DOCUMENTS

| | | | |
|---|---|---|---|
| 2009/0003435 A1 | 1/2009 | Cho et al. | |
| 2010/0008418 A1* | 1/2010 | Wu | H04N 19/186 375/240.12 |
| 2010/0020866 A1* | 1/2010 | Marpe | H04N 19/50 375/240.02 |
| 2010/0111167 A1* | 5/2010 | Wu | H04N 19/30 375/240.12 |
| 2013/0177066 A1* | 7/2013 | Ye | H04N 19/36 375/240.02 |
| 2014/0072041 A1* | 3/2014 | Seregin | H04N 19/105 375/240.13 |
| 2014/0341305 A1* | 11/2014 | Qu | H04N 19/70 375/240.26 |
| 2014/0348232 A1* | 11/2014 | Leontaris | H04N 19/597 375/240.12 |
| 2015/0103927 A1* | 4/2015 | Hannuksela | H04N 19/119 375/240.26 |
| 2015/0195523 A1* | 7/2015 | Sato | H04N 19/70 375/240.12 |
| 2015/0222913 A1 | 8/2015 | Sato | |
| 2015/0281701 A1* | 10/2015 | Auyeung | H04N 19/30 375/240.26 |
| 2015/0304664 A1* | 10/2015 | Li | H04N 19/186 375/240.02 |
| 2015/0373372 A1* | 12/2015 | He | H04N 19/13 375/240.12 |
| 2016/0295219 A1* | 10/2016 | Ye | G06T 9/40 |
| 2018/0139469 A1* | 5/2018 | Lainema | H04N 19/109 |

FOREIGN PATENT DOCUMENTS

| | | |
|---|---|---|
| JP | 2015-005899 | 1/2015 |
| WO | 2015/053112 | 4/2015 |
| WO | 2015/182342 | 12/2015 |

* cited by examiner

VIDEO IMAGE ENCODING DEVICE, VIDEO IMAGE CODING METHOD, VIDEO IMAGE DECODING DEVICE, VIDEO IMAGE DECODING METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-203497, filed on Oct. 17, 2016, the entire contents of which are incorporated herein by reference.

FIELD

The embodiment discussed herein is related to, for example, a video image encoding device and video image encoding method for hierarchically encoding video image data, a video image decoding device and video image decoding method for decoding hierarchically encoded video image data, and a non-transitory computer-readable storage medium.

BACKGROUND

The amount of video image data is large in general. Especially, the amounts of video image data, which conforms to standards that are 4K and 8K ultra-high-definition standards and the like and are related to a very large number of pixels, are significantly large in some cases. Thus, before a certain device that handles video image data transmits video image data to another device or to cause video image data to be stored in a storage device, the certain device compresses and encodes the video image data. As representative video image coding standards, there exist Moving Picture Experts Group Phase 2 (MPEG-2) developed by International Standardization Organization/International Electrotechnical Commission (ISO/IEC), MPEG-4, and H.264 MPEG-4 Advanced Video Coding (MPEG-4 AVC/H.264). In addition, as a new standard, High Efficiency Video Coding (HEVC, MPEG-H/H.265) has been developed.

On the other hand, a certain decoding device may not have computing power sufficient to decode encoded video image data and almost completely maintain the original quality of the video image data. Thus, as a technique for adaptively distributing video image data with different qualities based on the computing power of the decoding device, a hierarchical coding technique (also referred to as scalable coding) has been proposed. In the scalable coding, upon the decoding of encoded video image data, the resolution or frame rate of pictures included in the video image data may be reduced from the original resolution or frame rate. Due to the reduction in the resolution or frame rate, the decoding may be executed with low computing power.

In addition, it may be acceptable that while partial regions of pictures are reproduced with the original qualities, other regions of the pictures are reproduced with low qualities, depending on the use of video image data. Thus, a technique for switching between a block to be encoded in YCbCr 4:4:4 format and a block encoded in YCbCr 4:2:0 format on a block basis for each picture has been proposed. YCbCr 4:4:4 format is one of formats for representing pictures. In YCbCr 4:4:4 format, a value of each pixel is represented by a luminance signal Y and two color-difference signals Cb and Cr, and the spatial resolution (or picture size) of the luminance signal Y is equal to the spatial resolution of the two color-difference signals Cb and Cr. In YCbCr 4:2:0 format, two color-difference components (Cb and Cr) are downsampled to ½ in vertical and horizontal directions, compared with YCbCr 4:4:4 format.

In the conventional technique, a pixel value is checked for each of blocks within a picture, and the encoding using YCbCr 4:4:4 format and the encoding using YCbCr 4:2:0 format are switched based on the results of the checking. For example, a block including a small linear structure such as a character region is encoded in YCbCr 4:4:4 format, and a block including a video image generated by a camera is encoded in YCbCr 4:2:0 format. In this case, since the number of blocks encoded in YCbCr 4:4:4 format is minimal, the amount of video image data to be encoded is suppressed.

Examples of the related art include International Publication Pamphlet WO2015/182342 and Non-Patent Document (T. Lin, S. Wang, "Mixed Chroma Sampling-rate coding: combining the merits of 4:4:4 and 4:2:0 and increasing the value of past 4:2:0 investment", JCTVC-H0065, 8th JCT-VC Meeting, San Jose, USA, 1-10 Feb., 2012).

SUMMARY

According to an aspect of the invention, a video image decoding device includes: a memory; and a processor coupled to the memory and configured to execute a separation process that includes extracting, from encoded video image data including multiple images, first encoded data obtained by encoding reduced images of first images included in the multiple images, and second encoded data obtained by encoding second images included in the multiple images, the first images being continuous with each other in the order of the multiple images to be displayed, the second images being not continuous with each other in the order of the multiple images to be displayed, execute a first decoding process that includes decoding the reduced images of the first images from the first encoded data, execute a second decoding process that includes decoding the second images from the second encoded data, execute a motion region recording process that includes recording, upon the decoding of the reduced images of the first images, first region included in the reduced images of the first images, the first region including motions with respect to the second images immediately preceding the first images, and execute a synthesis process that includes reproducing the multiple images by modifying second region in the second images immediately preceding the first images in accordance with the first region including the motions on the reduced images of the first images, location of the second region corresponding to location of the first regions.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
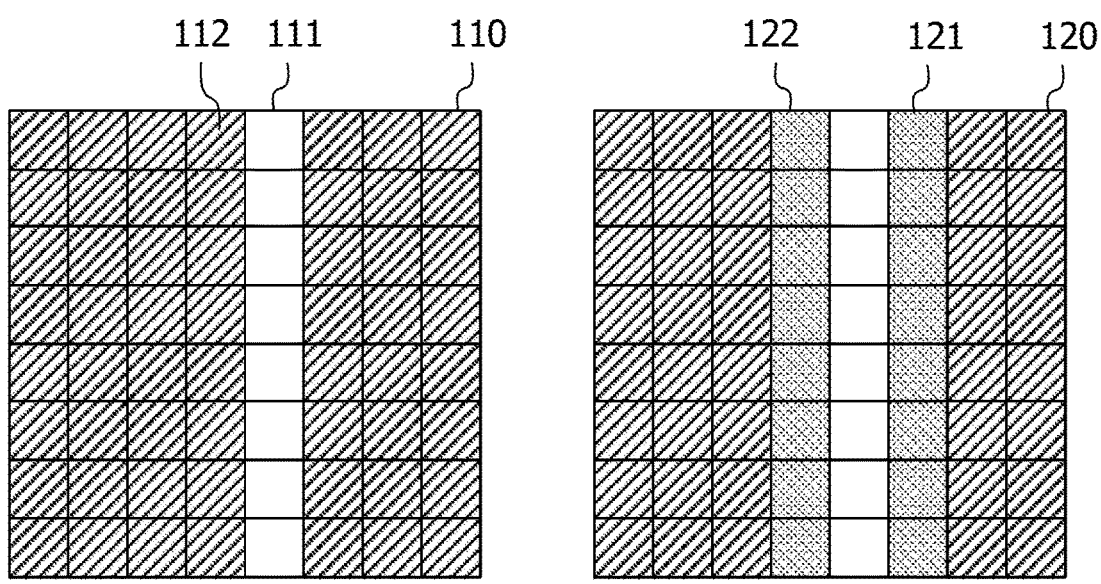
FIG. 1 is a diagram schematically illustrating an example of the degradation, caused by YCbCr 4:2:0 format, of an image quality.

According to an aspect of the conventional technique, since a block encoded in YCbCr 4:4:4 format and a block encoded in YCbCr 4:2:0 format exist in a picture, the configurations and control of a video image encoding device and a video image decoding device are complex. In addition, according to another aspect of the conventional technique, when predictive coding is to be executed on a picture, control, which is to be executed when a format for representing color differences within a block that is a reference source is different from a format for representing color differences within a block that is a reference destination, is complex. Thus, a coding standard that enables formats for representing color differences to be switched on a block basis does not exist as of this moment.

According to an aspect, the present disclosure aims to provide a video image encoding device and a video image decoding device that may improve a subjective image quality while suppressing the amount of information to be generated upon the encoding of video image data.

Hereinafter, the video image encoding device and the video image decoding device are described with reference to the accompanying drawings.

First, an example in which it is preferable that a block encoded in YCbCr 4:4:4 format and a block encoded in YCbCr 4:2:0 format exist in a picture is described below.

With the recent progress of the IT technology, video image coding has been considered to be applied to a screen video image displayed on a desktop screen of a computer. For example, there exist Wireless Display for wirelessly transmitting a video image displayed on a computer or a game machine to a display device and Virtual Display Infrastructure (VDI) for transmitting a user screen of a virtual OS to a thin client terminal. Regarding such a screen video image, in order to suppress the amount of information to be generated due to encoding and improve a subjective image quality, it is preferable that a region that is included in each picture of the screen video image and includes a motion be encoded in YCbCr 4:2:0 format and that other regions of each picture of the screen video image be encoded in YCbCr 4:4:4 format.

Specifically, the screen video image has different characteristics from a natural video image. For example, since the same object appears in a plurality of pixels in the natural video image in many cases, a high correlation exists between a value of a target pixel and a value of an adjacent pixel in many cases. On the other hand, in the screen video image, a large number of regions in which low correlations exist between adjacent regions exist. For example, in a region in which a character is displayed on a document edition screen or a region in which a thin line with a width of one pixel is displayed on a computer aided design (CAD) data edition screen, a correlation between pixels arranged side by side in a direction intersecting the character contour or the thin line is low.

Thus, in the screen video image, the difference between a picture represented in YCbCr 4:4:4 format and a picture represented in YCbCr 4:2:0 format may be clearly perceived. For example, a thin line with a width of one pixel, such as a wiring on a CAD image, includes color-difference components with high spatial frequencies. Thus, when a general flat background is used, and color-difference components are encoded and decoded using a low-spatial-resolution format, the degradation of an image quality may be noticeably recognized.

FIG. 1 is a diagram schematically illustrating an example of the degradation, caused by YCbCr 4:2:0 format, of an image quality. A picture 110 is an original picture represented in YCbCr 4:4:4 format. Values of pixels 112 other than a central vertical line 111 (with pixel values (Y, Cb, Cr)=(128, 0, 0)) are (0, 128, 128). A picture 120 is obtained by applying a 2:1 downsampling filter to color-difference components (Cb, Cr) of the original picture in horizontal and vertical directions to change the original picture to a picture in YCbCr 4:2:0 format and applying an 1:2 upsampling filter to the picture to restore the picture to the picture in YCbCr 4:4:4 format. In the picture 120 generated by applying the downsampling filter and the upsampling filter, color-difference component values of pixels located close to edges are changed from the original values. In this example, values of pixels on a central vertical line 121 located at the same position as the vertical line 111 of the original picture 110 are changed from (128, 0, 0) to (128, 32, 32), while values of pixels on lines 122 located on both sides of the line 121 and adjacent to the line 121 are changed from (0, 128, 128) to (0, 88, 88). If a background is uniform, the changes in the pixel values may be clearly perceived.

In order to avoid the degradation, caused by the encoding and decoding of a picture, of a structure such as a thin line with a width of one pixel on the picture, it is preferable that blocks including the structure be encoded and decoded in YCbCr 4:4:4 format (or RGB 4:4:4 format).

In YCbCr 4:4:4 format, however, the number of pixels of color-difference components to be encoded is large, compared with YCbCr 4:2:0 format, and the amount of information to be generated due to the encoding increases. It is, therefore, preferable that blocks that do not include such a structure be encoded in YCbCr 4:2:0 format in order to suppress the amount of information to be generated. Especially, in a screen video image, displayed contents may vary, depending on a region (for example, a window) included in a picture. For example, a document or the like that includes a structure such as a thin line is displayed in a certain region, while a natural image is displayed in another region.

A natural image may be displayed in a screen video image, or a user may perform an operation on the screen video image. Alternatively, as time passes, a certain object may move or change in shape in a region used for executing an application. In a region (hereinafter referred to as "motion region") in which a certain object makes such a motion, it is difficult to detect the degradation of color-difference components due to human perceptual characteristics. The degradation of the color-difference components is the degradation of perceptual characteristics of the resolution of the color-difference components (Cb, Cr), compared with a luminance component (Y).

Especially, in a natural image, since color-difference components with a high spatial frequency are lost due to downsampling and almost no color-difference components with a high spatial frequency exist, the difference between a picture represented in YCbCr 4:4:4 format and a picture represented in YCbCr 4:2:0 format may be hardly perceived. Thus, as described above, since a region that includes a motion is encoded in YCbCr 4:2:0 format and other regions are encoded in YCbCr 4:4:4 format, it is possible to suppress the amount of information to be generated and improve a subjective image quality.

This video image encoding device hierarchically encodes, in YCbCr 4:4:4 and YCbCr 4:2:0 formats, color-difference components (Cb and Cr) of each picture of video image data to be encoded. In this case, regarding color-difference components to be encoded in YCbCr 4:4:4 format, the video image encoding device encodes color-difference components in YCbCr 4:4:4 format for one of multiple pictures to be continuously displayed in the order of the pictures to be displayed. Regarding color-difference components to be encoded in YCbCr 4:2:0 format, the video image encoding device encodes color-difference components of each picture in YCbCr 4:2:0 format. Thus, in picture decoding, the video image decoding device may use, for a region that does not include a motion on a picture, an immediately preceding picture including color-difference components encoded in YCbCr 4:4:4 format, and may use, for a motion region of a picture, color-difference components encoded in YCbCr 4:2:0 format and included in the picture.

Figure 2:
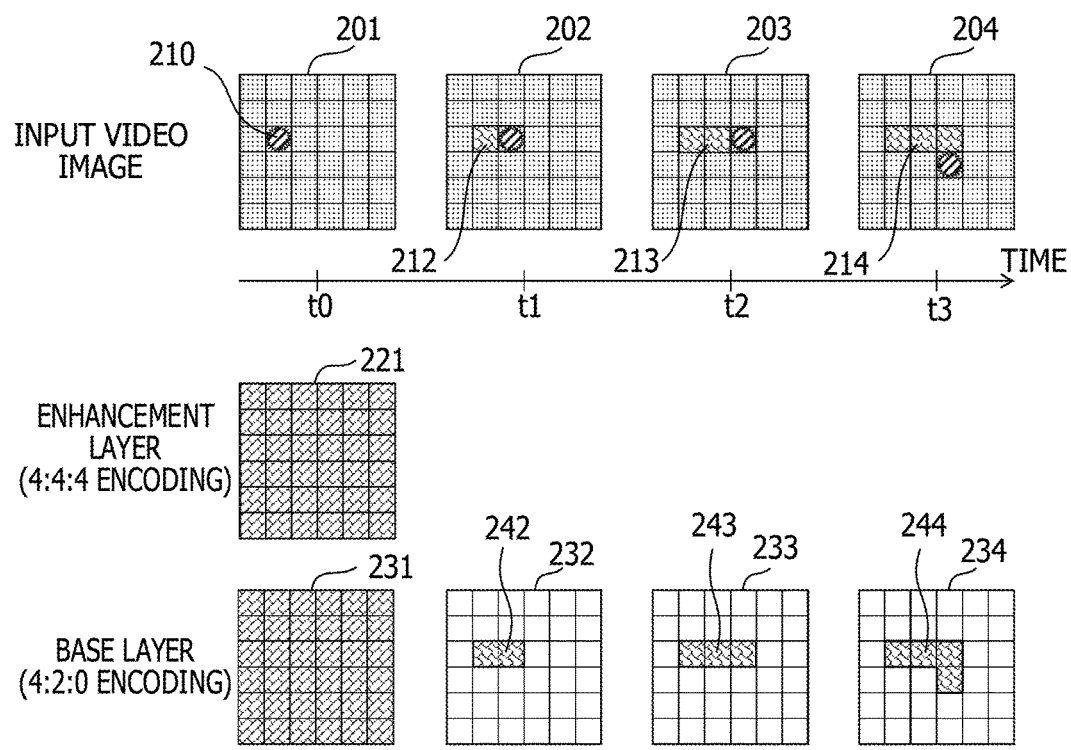
FIG. 2 is a schematic diagram illustrating the hierarchical coding of video image data according to an embodiment.

FIG. 2 is a schematic diagram of hierarchical coding of the video image data according to an embodiment.

For example, the input video image data is a screen video image to be displayed on a desktop screen and includes pictures 201, 202, 203, and 204 to be displayed at time t0, t1, t2, and t3. The pictures are represented in YCbCr 4:4:4 format. It is assumed that, in the pictures 201 to 204, a foreground 210 moves and other backgrounds do not change.

As described above, it is difficult to detect the degradation of color-difference components of a motion region due to human perceptual characteristics. Regions in which the foreground 210 exists and regions temporarily hidden by the foreground 210 temporarily become motion regions. By encoding and displaying these regions in YCbCr 4:2:0 format, the video image encoding device and the video image decoding device may reduce the amount of information to be generated due to the encoding while suppressing the degradation of a subjective image quality. For example, in the picture 202 at time t1, a region including the foreground 210 and a region 212 including a background temporarily hidden by the foreground 210 at time t0 are motion regions. Similarly, in the picture 203 at time t2, a region including the foreground 210 and a region 213 temporarily hidden by the foreground 210 at time t0 and t1 are motion regions. In addition, in the picture 204 at time t3, a region including the foreground 210 and a region 214 temporarily hidden by the foreground 210 at time t0 to t2 are motion regions. Other regions are still regions. In order to avoid the visual degradation of the image quality, it is preferable that the still regions be encoded and displayed in YCbCr 4:4:4 format.

In an enhancement layer in which color-difference components of pictures encoded in YCbCr 4:4:4 format are handled, color-difference components 221 of the picture 201 at time t0 are encoded. Each of blocks of the color-difference components 221 is subjected to inter-predictive coding using, as a reference image, an image obtained by upsampling, to YCbCr 4:4:4 format, locally decoded images of the color-difference components 231 of the picture 201 at the same time (or time t0) in a base layer in which color-components encoded in YCbCr 4:2:0 format are handled. Since the input video image is the screen video image to be displayed on the desktop screen, there is not a change or there is a very small change in regions other than a region in which a user performs an operation or a region used for executing an application program. For example, in a time period from time t1 to time t3, pixel values are not changed in the still regions other than the motion regions, motion vectors are 0 vectors in blocks within the still regions, and predictive error signals are completely 0 in the blocks within the still regions. Thus, even if the blocks within the still regions are encoded, orthogonal transform and the like are skipped. However, even if the skipping is applied, information indicating that the skipping have been applied on a block basis is to be encoded. In the embodiment, in the time period from time t1 to t3, the picture encoding is skipped for the enhancement layer.

In the color-difference components 231 at time t0 that correspond to the color-difference components included in the enhancement layer and encoded, each block is subjected to intra-predictive coding. Hereinafter, a picture that includes color-difference components that are encoded in both enhancement layer and base layer is referred to as simultaneous encoding picture for convenience sake. Simultaneous encoding pictures are not continuous with each other in the order of the pictures to be displayed. Blocks of color-difference components 232 to 234, corresponding to the color-difference components that are included in the enhancement layer and are not encoded, of the pictures at time t1 to t3 are subjected to inter-predictive coding using, as reference images, locally decoded images of color-difference components of pictures at immediately previous time in the base layer. In this case, the motion regions or the regions including the foreground or blocks included in background regions temporarily hidden by the foreground are encoded without the skipping. The encoding to be executed without the skipping, or the calculation of a predictive error signal, the orthogonal transform, and quantization is or are hereinafter referred to as non-skip encoding.

Since the other blocks included in the still regions completely match corresponding regions of immediately preceding pictures, the encoding is skipped (in the present specification, skipping the encoding on a block basis indicates that the orthogonal transform of a predictive error signal and the quantization are omitted). In this example, in the color-difference components 232 of the picture at time t1, blocks included in a region 242 are subjected to the non-skip encoding, and the encoding of blocks included in other regions is skipped. In addition, in the color-difference components 233 of the picture at time t2, blocks included in a region 243 are subjected to the non-skip encoding, and the encoding of blocks included in other regions is skipped. Similarly, in the color-difference components 234 of the picture at time t3, blocks included in a region 244 are subjected to the non-skip encoding, and the encoding of blocks included in other regions is skipped.

In the embodiment, the video image encoding device encodes the video image data in accordance with H.265 that is one of coding standards to which hierarchical coding is applicable for spatial resolution. The video image encoding device, however, may encode the video image data in accordance with another coding standard to which the hierarchical coding is applicable for spatial resolution.

In addition, it is assumed that the pictures included in the video image data are represented in YCbCr formats. Specifically, each of the pictures is represented by a luminance component and two color-difference components. Each of a luminance component and two color-difference components of each of the pictures is an example of an image included in video image data. Each of the pictures may be a frame or a field. The frame is a single still image included in the video image data, while a field is a still image obtained by extracting data of an odd row or data of an even row from the frame.

Figure 3:
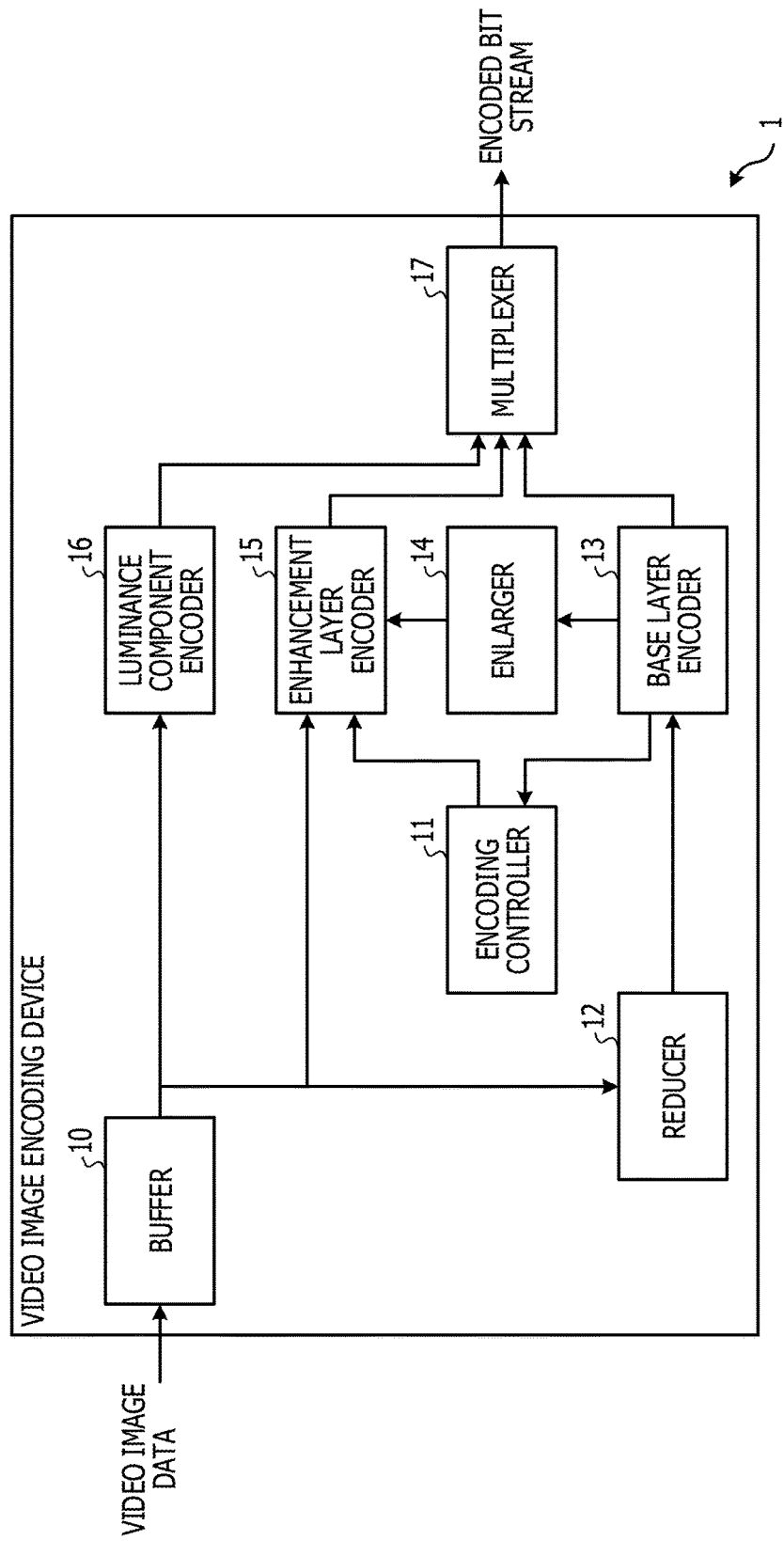
FIG. 3 is a schematic diagram illustrating a video image encoding device according to the embodiment.

FIG. 3 is a schematic diagram illustrating the video image encoding device according to the embodiment. The video image encoding device 1 includes a buffer 10, an encoding controller 11, a reducer 12, a base layer encoder 13, an enlarger 14, an enhancement layer encoder 15, a luminance component encoder 16, and a multiplexer 17.

According to a first aspect of the present disclosure, the sections included in the video image encoding device 1 may be formed as circuits that are separated from each other. According to a second aspect of the present disclosure, the sections included in the video image encoding device 1 may be implemented as one or multiple integrated circuits formed by integrating circuits corresponding to the sections in the video image encoding device 1. According to a third aspect of the present disclosure, the sections included in the video image encoding device 1 may be functional modules achieved by a computer program executed on one or multiple processors included in the video image encoding device 1.

The pictures included in the video image data are input to the buffer 10 in the order of the pictures to be reproduced. The pictures accumulated in the buffer 10 are sequentially read in the order in which the pictures set by the encoding controller 11 are to be encoded. The buffer 10 may store various types of data generated during an encoding process and including locally decoded images.

The encoding controller 11 determines pictures to be encoded by the enhancement layer encoder 15 among the pictures included in the input video image data or determines simultaneous encoding pictures. For example, the encoding controller 11 calculates the ratio of a group of regions including motions in color-difference components of each picture in the base layer between a simultaneous encoding picture immediately preceding a target picture and the target picture to the color-difference components of the picture in the base layer. If the ratio is equal to or higher than a predetermined ratio (of, for example, 0.25), the encoding controller 11 sets a picture immediately succeeding the target picture to a simultaneous encoding picture. Thus, as a motion on a picture is smaller, the encoding controller 11 may set an interval between simultaneous encoding pictures to be longer. Thus, as a motion on a picture is smaller, the amount of information to be generated due to the encoding may be smaller. In addition, the encoding controller 11 resets the number of blocks to be subjected to the non-skip encoding to 0 for each of the simultaneous encoding pictures.

The encoding controller 11 may calculate, as the aforementioned ratio, the ratio of the total number of blocks to be subjected to the non-skip encoding and included in color-difference components of a certain picture in the base layer between a simultaneous encoding picture immediately preceding a target picture and the target picture to the total number of blocks included in the color-difference components of the certain picture in the base layer. Alternatively, the encoding controller 11 may calculate, as the aforementioned ratio, the ratio of the number of pixels to be subjected to the non-skip encoding and included in color-difference components of a certain picture in the base layer between a simultaneous encoding picture immediately preceding a target picture and the target picture to the total number of pixels included in the color-difference component of the certain picture in the base layer. The encoding controller 11 may separately determine a simultaneous encoding picture for each color-difference component or determine, as a simultaneous encoding picture, a picture immediately succeeding a picture of which the ratio calculated for any of two color-difference components is equal to or higher than the predetermined ratio.

Alternatively, the encoding controller 11 may determine, as the simultaneous encoding pictures, pictures to be displayed in each of certain intervals set in advance. In this case, the encoding controller 11 may set, to a certain interval, intervals between pictures (or simultaneous encoding pictures) reproducible by the video image decoding device from a middle of the input video image data.

The encoding controller 11 reads the pictures included in the video image data from the buffer 10 in the order of the pictures to be displayed. Then, the encoding controller 11 passes color-difference components of the simultaneous encoding pictures to the reducer 12 and the enhancement layer encoder 15. The encoding controller 11 passes color-difference components of pictures other than the simultaneous encoding pictures to the reducer 12.

The encoding controller 11 passes luminance components of the pictures to the luminance component encoder 16 in the order of the pictures to be displayed.

The reducer 12 downsamples the input color components for each of color differences (Cb and Cr) to generate color-difference components, having smaller numbers of pixels than those of pixels of the input color-difference components, of the base layer. The color-difference components of the base layer are an example of reduced images. In the embodiment, the input color-difference components or color-difference components of the enhancement layer are in YCbCr 4:4:4 format, while the color-difference components of the base layer are in YCbCr 4:2:0 format. Thus, the reducer 12 reduces the input color-difference components to ½ of the original components in the horizontal and vertical directions. Specifically, the reducer 12 reduces the numbers of the input color-difference components in the horizontal and vertical directions to ½ of the numbers of the original components in the horizontal and vertical directions.

The reducer 12 smooths the input color-difference components by applying a smoothing filter such as a Gaussian filter or an averaging filter to the input color-difference components for each of the color differences. Then, the reducer 12 downsamples the smoothed color-difference components for each of the color differences based on the reduction rates (of ½ in the embodiment) in the horizontal and vertical directions to generate the color-difference components of the base layer.

The reducer 12 outputs the color-difference components of the base layer to the base layer encoder 13 for each of the pictures.

The base layer encoder 13 encodes the color-difference components of the base layer for each of the pictures. Since the base layer encoder 13 applies the same encoding process to both color-difference components Cb and Cr, the encoding process to be executed on a single color-difference component is described below.

The base layer encoder 13 divides a color-difference component of a picture to be encoded into coding tree units (CTUs) and encodes the CTUs in the order of the CTUs to be subjected to a raster scan. In this case, the base layer encoder 13 divides each of the CTUs into multiple coding units (CUs) in a quadtree structure. The CUs are an example of blocks. Then, the base layer encoder 13 generates a predictive block for each of prediction units (PUs) set in the CUs while referencing a locally decoded image obtained by decoding a color-difference component of an encoded picture or an encoded region of a picture to be encoded. Then, the base layer encoder 13 calculates, for each CU, a differential value between each pixel within the CU and each corresponding pixel of a predictive block as a predictive error signal. Then, the base layer encoder 13 executes orthogonal transform on the predictive error signals and calculates a pair of orthogonal transform coefficients for each of transform units (TU) set in the CUs. The base layer encoder 13 quantizes a pair of orthogonal transform coefficients calculated for each of the TUs based on a predetermined encoding rate and executes entropy encoding on the quantized orthogonal transform coefficients. In addition, the base layer encoder 13 may execute the entropy encoding on information that has been used for the generation of the predictive blocks and is, for example, a motion vector for motion compensation. In this manner, the base layer encoder 13 calculates encoded data of the color-difference component.

The base layer encoder 13 may select a CU size, a PU size, and a TU size for each CTU from among multiple set CU sizes, multiple set PU sizes, and multiple set TU sizes so that coding cost is minimized.

In the embodiment, as described above, the base layer encoder 13 executes intra-predictive coding on each of CUs for a simultaneous encoding picture. Specifically, the base layer encoder 13 references an encoded region of a color-difference component of the picture and generates a predictive block for each of PUs set in CUs of the picture. Thus, the video image encoding device 1 may encode the input video image data so that the video image data is reproducible from the simultaneous encoding picture.

Regarding a picture that is not a simultaneous encoding picture or in which a color-difference component of the enhancement layer is not encoded, the base layer encoder 13 calculates, for each of CUs, the sum of absolute values of differential values between pixels of a region of the color-difference component of the target picture and pixels of a region included in an immediately preceding picture and located at the same position as the region of the target picture. Then, the base layer encoder 13 skips the encoding for a CU whose sum of absolute values of differential values is 0 or a CU that completely matches a region included in a color-difference component of the immediately preceding picture and located at the same position as the region of the target picture. Then, the base layer encoder 13 adds information indicating that the encoding has been skipped to encoded data for the CU for which the encoding has been skipped.

In addition, the base layer encoder 13 executes inter-predictive coding on CUs whose sums of absolute values of differential values are not 0, while referencing the color-difference component of the picture immediately preceding the target picture in the order of the pictures to be displayed. Specifically, the base layer encoder 13 executes block matching on each PU within each of the CUs whose sums of absolute values of differential values are not 0, calculates a region best matching a locally decoded image obtained from the immediately preceding picture, and determines the region as a predictive block. Thus, the video image encoding device 1 may execute the non-skip encoding on a CU included in a motion region and skip the encoding on other CUs, thereby reducing the amount of information to be generated due to the encoding.

The base layer encoder 13 outputs encoded data to the multiplexer 17 and notifies information indicating the positions and range of CUs subjected to the non-skip encoding to the encoding controller 11 for each of the color-difference components. In addition, the base layer encoder 13 executes inverse quantization and inverse orthogonal transform on pairs of quantized orthogonal transform coefficients of TUs to reproduce predictive error signals for each of the color-difference components and adds values of corresponding pixels of predictive blocks to the reproduced predictive error signals to calculate locally decoded images for the color-difference components. Then, the base layer encoder 13 causes the locally decoded images to be stored in the buffer 10. In addition, the base layer encoder 13 outputs locally decoded images of the color-difference components of the simultaneous encoding pictures to the enlarger 14.

According to a modified example, the base layer encoder 13 may determine whether or not the encoding is to be skipped for each of CTUs of the pictures other than the simultaneous encoding pictures. In this case, the CTUs are another example of blocks. In this example, the base layer encoder 13 calculates, for each of the CTUs, the sum of absolute values of differential values between pixels of a region of each of color-difference components of a target picture and pixels of a region, located at the same position as the region of the target picture, of each of color-difference components of a picture immediately preceding the target picture, and may determine that the encoding is skipped for a CTU whose sum of absolute values of differential values is 0. According to another modified example, the base layer encoder 13 may compare, for each CU or CTU, the sum of absolute values of differential values between pixels corresponding to each other with a predetermined threshold other than 0, and skip the encoding for a CU or CTU whose sum of absolute values of differential values is smaller than the predetermined threshold. The predetermined threshold may be set to, for example, a value that makes acceptable the degradation, caused by the replacement of any pixel value within the CU or CTU with a pixel value of a past picture, of an image quality. Thus, since the number of blocks for which the encoding is skipped increases, the video image encoding device 1 may reduce the amount of information to be generated due to the encoding.

The enlarger 14 upsamples locally decoded images of two color-difference components of each of the simultaneous encoding pictures in the base layer, thereby generating locally decoded images (hereinafter referred to as enlarged locally decoded images) to be referenced upon the encoding of each of the color-difference components of the enhancement layer.

For example, the enlarger 14 generates the enlarged locally decoded images by applying an upsampling filter defined for H.264 scalable video coding to the locally decoded images. The enlarger 14 may apply another upsampling filter.

The enlarger 14 outputs the enlarged decoded images for the color-difference components to the enhancement layer encoder 15.

The enhancement layer encoder 15 encodes the color-difference components of the simultaneous encoding pictures in the enhancement layer. The enhancement layer encoder 15 may encode the color-difference components in accordance with H.265, like the base layer encoder 13. Thus, a detailed description of an encoding process by the enhancement layer encoder 15 is omitted.

In the embodiment, however, the enhancement layer encoder 15 executes inter-predictive coding on each of the color-difference components of the pictures while referencing enlarged locally decoded images for the same pictures, and calculates encoded data of the color-difference components of the pictures. Specifically, the enhancement layer encoder 15 executes block matching on each PU of the picture, calculates regions best matching the enlarged locally decoded images for the same picture, and determines the regions as predictive blocks. The enhancement layer encoder 15 may execute intra-predictive coding on a block whose coding cost is lower than that obtained from the inter-predictive coding executed on the block.

The enhancement layer encoder 15 outputs encoded data of color-difference components of the simultaneous encoding pictures in the enhancement layer to the multiplexer 17.

Figure 4:
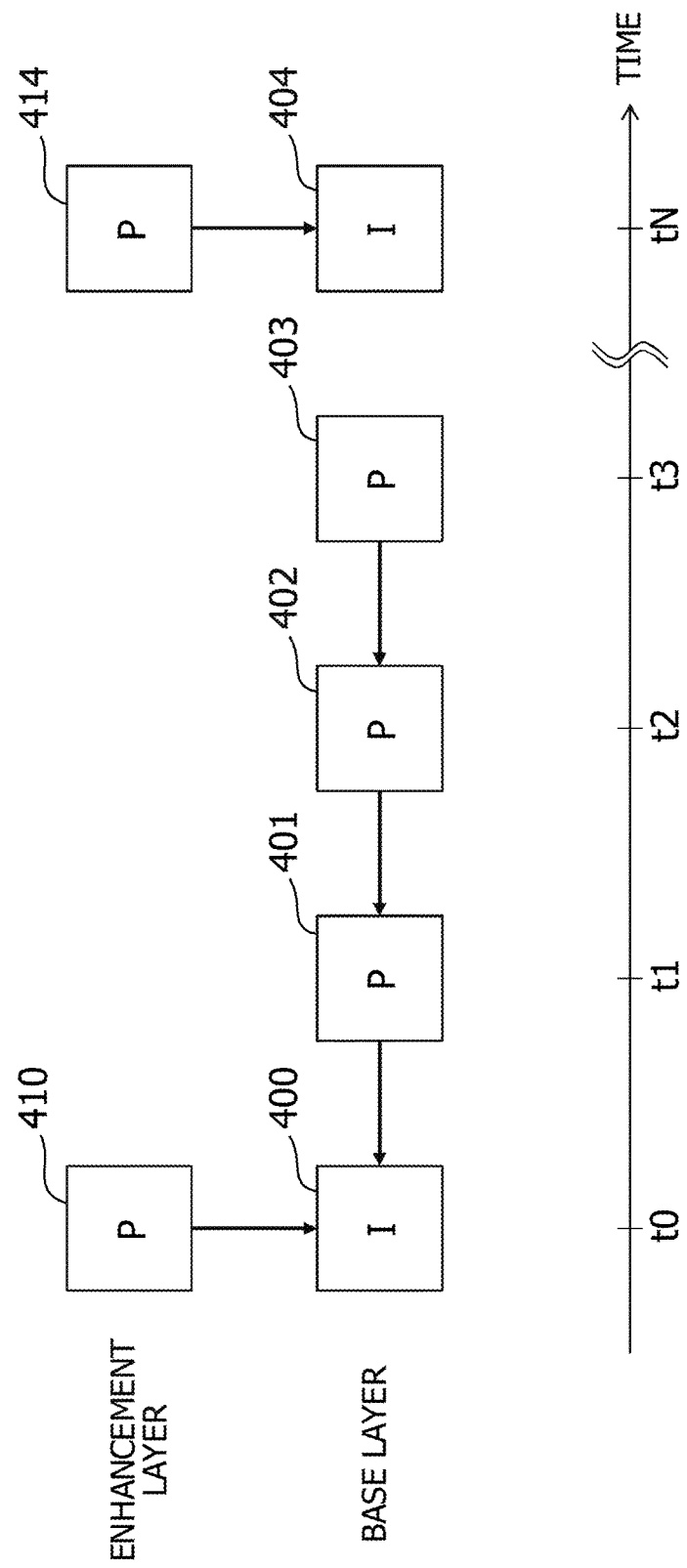
FIG. 4 is a diagram illustrating an example of reference relationships between a base layer and an enhancement layer.

FIG. 4 is a diagram illustrating an example of reference relationships between the base layer and the enhancement layer. In FIG. 4, an abscissa indicates time. Each of rectangular regions indicates color-difference components of a single picture. A picture at time t0 and a picture at tN indicate simultaneous encoding pictures. Symbols indicated in blocks indicating color-difference components of pictures indicate predictive coding modes applied. In this case, I indicates an intra-predictive coding mode, and P indicates an inter-predictive coding mode. Arrows indicate reference relationships. The tips of the arrows indicate color-difference components that are reference destinations, while the roots of the arrows indicate color-difference components that are reference sources.

As illustrated in FIG. 4, color-difference components 400 of the simultaneous encoding picture of the base layer at time t0, and color-difference components 404 of the simultaneous encoding picture of the base layer at time tN, are subjected to the intra-predictive coding. Color-difference components 401 to 403 of pictures of the base layer at time t1 to t3 are subjected to the inter-predictive coding by referencing locally decoded images of color-difference components of immediately preceding pictures of the same base layer. The pictures at time t1 to t3 are not simultaneous encoding pictures. In addition, color-difference components 410 of the simultaneous encoding picture of the enhancement layer at time t0 and color-difference components 414 of the simultaneous encoding picture of the enhancement layer at time tN are subjected to the inter-predictive coding by referencing enlarged locally decoded images of the color-difference components 400 and 404 of the base layer at the same time.

The luminance component encoder 16 encodes the luminance components of the pictures of the input video image data. The luminance component encoder 16 may encode the luminance components of the pictures in accordance with H.265, like the base layer encoder 13, for example. The luminance component encoder 16, however, may determine whether each of the pictures is subjected to the intra-predictive coding or the inter-predictive coding in accordance with a predetermined group of pictures (GOP). In the embodiment, since the luminance components of the base layer are the same as the luminance components of the enhancement layer, the luminance component encoder 16 may encode the luminance components of the pictures of the base layer of the base and enhancement layers.

The luminance component encoder 16 outputs encoded data of the luminance components of the pictures to the multiplexer 17.

The multiplexer 17 synthesizes the encoded data of the color-difference components of the pictures of the base layer, the encoded data of the color-difference components of the simultaneous encoding pictures of the enhancement layer, and the encoded data of the luminance components of the pictures in a predetermined order. In addition, the multiplexer 17 adds header information conforming to H.265 or the like to the synthesized encoded data, thereby generating a bit stream including the encoded video image data. In this case, the multiplexer 17 adds time information (for example, Decode TimeStamp and Presentation TimeStamp) indicating decoding time and display time for each of the pictures to the encoded data of the color-difference components of the base and enhancement layers and the encoded data of the luminance components. Thus, the video image decoding device (described later) may identify the simultaneous encoding pictures among the pictures by referencing the time information.

Figure 5:
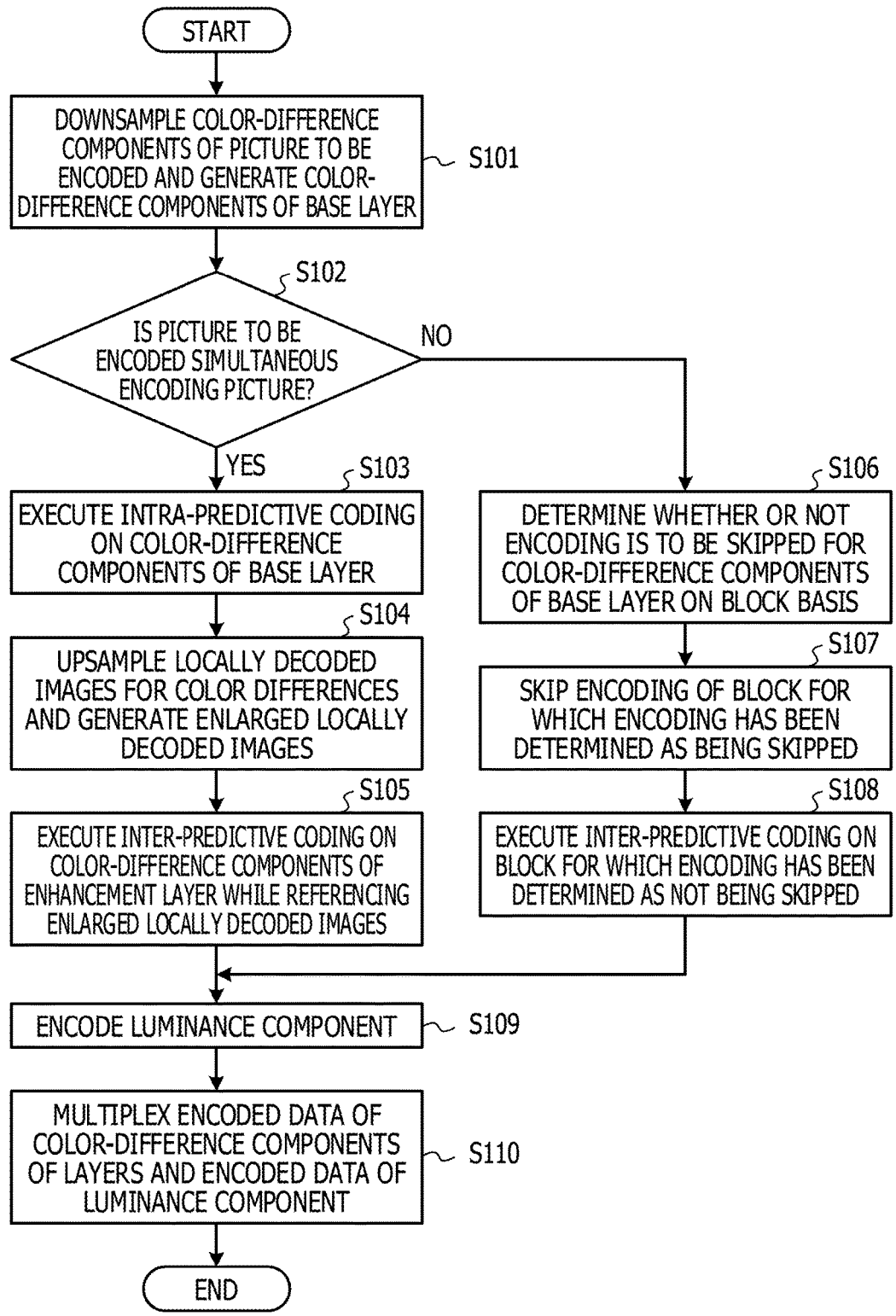
FIG. 5 is an operational flowchart of a video image encoding process.

FIG. 5 is an operational flowchart of a video image encoding process by the video image encoding device 1. The video image encoding device 1 executes the encoding on each of the pictures in accordance with the following operational flowchart.

The reducer 12 downsamples color-difference components of a target picture to be encoded, thereby generating color-difference components of the base layer (in step S101). The encoding controller 11 determines whether or not the target picture to be encoded is a simultaneous encoding picture based on the ratio of a group of motion regions included in a picture immediately preceding the target picture to the total of the color-difference components of the base layer (in step S102). If the target picture to be encoded is the simultaneous encoding picture (Yes in step S102), the base layer encoder 13 executes the intra-predictive coding on each of blocks of the color-difference components of the base layer (in step S103). Then, the enlarger 14 upsamples locally decoded images of the color-difference components to generate enlarged locally decoded images for the color differences (in step S104).

The enhancement layer encoder 15 executes inter-predictive coding on each of the blocks of the color-difference components of the target picture, which is to be encoded and is the simultaneous encoding picture, of the enhancement layer while referencing the enlarged locally decoded images corresponding to the color-difference components of the target picture (in step S105).

If the target picture to be encoded is not the simultaneous encoding picture (No in step S102), the base layer encoder 13 determines whether or not the encoding is to be skipped for each of the blocks of the color-difference components of the base layer (in step S106). Then, the base layer encoder 13 skips the encoding for a block for which the encoding has been determined as being skipped (in step S107). In addition, the base layer encoder 13 references locally decoded images of color-difference components of the immediately preceding picture of the base layer and executes the inter-predictive coding on a block for which the encoding has been determined as not being skipped (in step S108).

In addition, the luminance component encoder 16 encodes a luminance component of the target picture to be encoded (in step S109). Then, the multiplexer 17 multiplexes encoded data of the color-difference components of the base layer and encoded data of the luminance component (in step S110). If the target picture to be encoded is the simultaneous encoding picture, the multiplexer 17 multiplexes encoded data of the color-difference components of the enhancement layer (in step S110). Then, the video image encoding device 1 terminates the video image encoding process. The process of step S109 may be executed before the process of step S102 or executed in parallel with the processes of steps S102 to S108.

Next, the video image decoding device that decodes the video image data encoded by the aforementioned video image encoding device is described.

Figure 6:
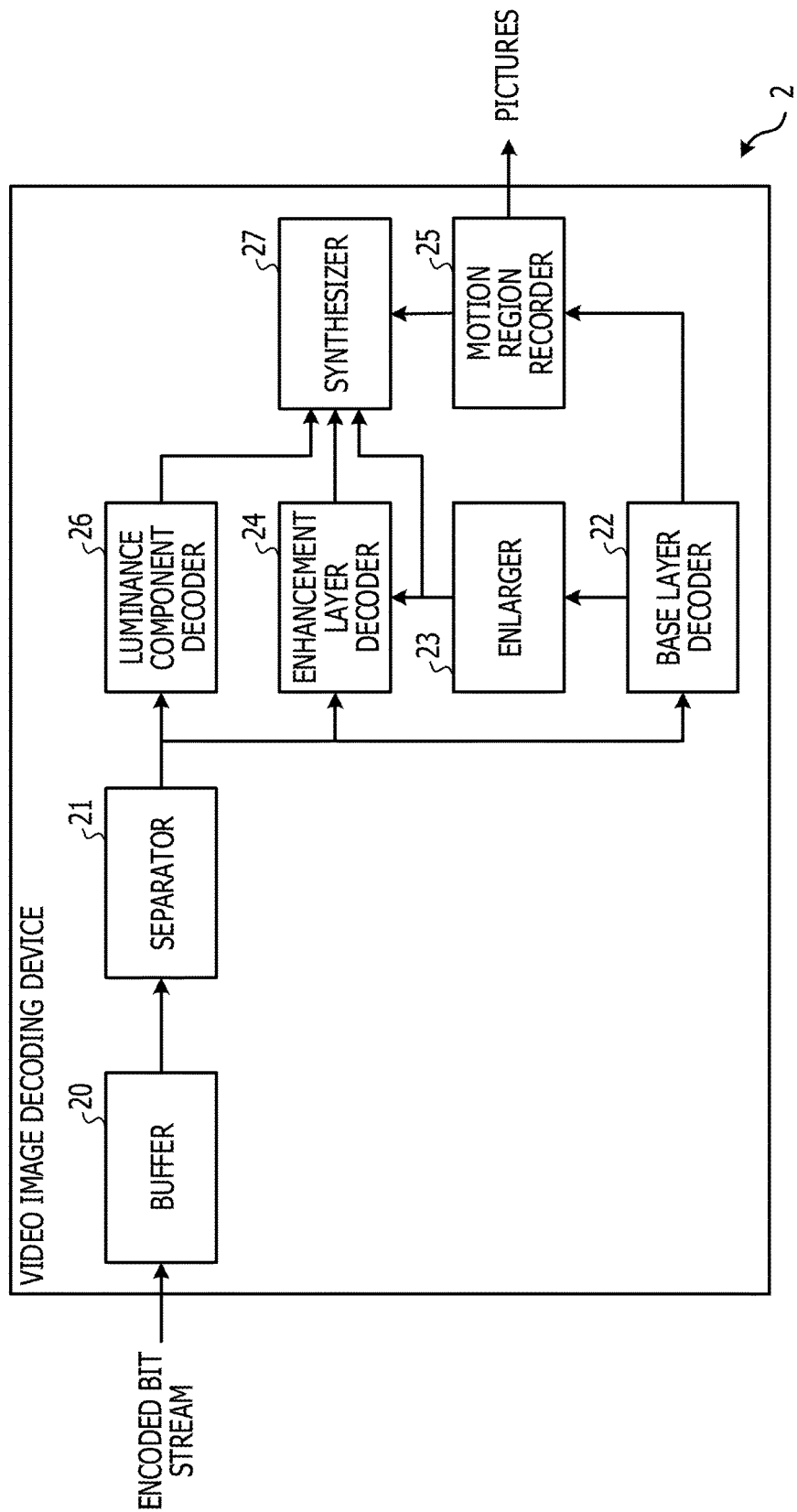
FIG. 6 is a schematic diagram illustrating a video image decoding device according to the embodiment.

FIG. 6 is a schematic configuration diagram of the video image decoding device according to the embodiment. The video image decoding device 2 includes a buffer 20, a separator 21, a base layer decoder 22, an enlarger 23, an enhancement layer decoder 24, a motion region recorder 25, a luminance component decoder 26, and a synthesizer 27.

The sections included in the video image decoding device 2 are implemented as separate circuits in the video image decoding device 2. Alternatively, the sections included in the video image decoding device 2 may be implemented as one or multiple integrated circuits formed by integrating circuits achieving functions of the sections in the video image decoding device 2. Alternatively, the sections included in the video image decoding device 2 may be functional modules achieved by a computer program executed on a processor included in the video image decoding device 2.

The bit stream including the encoded video image data is input to the buffer 20. Then, encoded data of two color-difference components of each of the pictures of the layers of the encoded video image data and encoded data of a luminance component of each of the pictures are sequentially read in the order of the pictures to be displayed. In addition, the buffer 20 may store various types of data that has been generated during a video image decoding process and is the decoded color-difference components of the layers and the decoded luminance components.

The separator 21 extracts, from the bit stream including the encoded video image data, the encoded data of the color-difference components of the pictures of the base layer, the encoded data of the color-difference components of the simultaneous encoding pictures of the enhancement layer, and the encoded data of the luminance components of the pictures. Then, the separator 21 outputs the encoded data of the color-difference components of the base layer to the base layer decoder 22 and outputs the encoded data of the color-difference components of the enhancement layer to the enhancement layer decoder 24. In addition, the separator 21 outputs the encoded data of the luminance components to the luminance component decoder 26.

The base layer decoder 22 decodes color-difference components of each of the pictures of the base layer. In the embodiment, the base layer decoder 22 decodes each of the color-difference components in accordance with H.265. Specifically, the base layer decoder 22 executes entropy decoding on the encoded data of the color-difference components. Then, the base layer decoder 22 reproduces, for each of blocks subjected to the non-skip encoding and included in each of the color-difference components, a pair of quantization coefficients or coefficients obtained by quantizing a pair of orthogonal transform coefficients obtained by executing the orthogonal transform on predictive error signals on a TU basis.

The base layer decoder 22 executes inverse quantization and inverse orthogonal transform on the pairs of the reproduced quantization coefficients on a TU basis and reproduces a predictive error signal of each of the blocks subjected to the non-skip encoding.

In addition, the base layer decoder 22 identifies, from the header information, a coding mode applied to the blocks subjected to the non-skip encoding. Then, if a target block is already subjected to the inter-predictive coding, the base layer decoder 22 decodes a motion vector of the block and determines, as a predictive block, a region specified by the motion vector and included in a color-difference component of a decoded picture. In addition, if the target block is already subjected to the intra-predictive coding, the base layer decoder 22 calculates a predictive block from a decoded region of a color-difference component to be decoded. Then, the base layer decoder 22 reproduces each of the blocks subjected to the non-skip encoding by adding, to values of pixels of predictive blocks corresponding to the blocks, reproduced predictive error signals corresponding to the pixels.

In addition, regarding a block for which the encoding has been skipped, the base layer decoder 22 may copy a block, which is included in a decoded immediately preceding picture and located at the same position as the block for which the encoding has been skipped, to the block for which the encoding has been skipped.

Then, the base layer decoder 22 synthesizes the reproduced blocks with each other in the order of the blocks to be encoded for each of the color-difference components, thereby reproducing the color-difference components. The base layer decoder 22 causes the reproduced color-difference components to be stored in the buffer 20.

If the video image decoding device 2 conforms to another coding standard, the base layer decoder 22 decodes the color-difference components of the base layer in accordance with the coding standard to which the video image decoding device 2 conforms.

Every time the base layer decoder 22 decodes color-difference components of a picture other than the simultaneous encoding pictures, the base layer decoder 22 notifies the motion region recorder 25 of the positions and range of blocks included in color-difference components and subjected to the non-skip encoding.

The enlarger 23 upsamples the color-difference components of the pictures of the base layer.

For example, the enlarger 23 generates enlarged locally decoded images of the same size as the color-difference components of the enhancement layer by applying an upsampling filter defined for H.264 scalable video coding to the color-difference components of the base layer. In this example, the color-difference components of the base layer are enlarged to the same size as color-difference components in YCbCr 4:4:4 format. The enlarger 23 may apply another upsampling filter.

The enlarger 23 causes the enlarged color-difference components of the pictures to be stored in the buffer 20.

The enhancement layer decoder 24 decodes color-difference components of the simultaneous encoding pictures of the enhancement layer. In the embodiment, the enhancement layer decoder 24 may decode the color-difference components in accordance with H.265, like the base layer decoder 22. Thus, a detailed description of a decoding process by the enhancement layer decoder 24 is omitted. If the video image decoding device 2 conforms to another coding standard, the enhancement layer decoder 24 decodes the color-difference components of the enhancement layer in accordance with the coding standard to which the video image decoding device 2 conforms.

The motion region recorder 25 generates motion region maps indicating a region subjected to the non-skip encoding or a motion region for color-difference components of the base layer between two continuous simultaneous encoding pictures. Thus, every time the motion region recorder 25 receives the positions and range of blocks subjected to the non-skip encoding from the base layer decoder 22, the motion region recorder 25 updates the motion region maps by adding the positions and range of the blocks to the motion region maps for the color-difference components. Specifically, the motion region is a group of blocks subjected to the non-skip encoding and included in pictures from a simultaneous encoding picture immediately preceding a target picture to be encoded up to the target picture. In addition, every time a simultaneous encoding picture is decoded, the motion region recorder 25 resets the motion region maps so that whole motion regions are deleted from the motion region maps. The motion region recorder 25 may reference the time information added to the encoded data of the color-difference components of the layers and indicating the display time and the like, and determine that pictures, each of which includes color-difference components, to be displayed at the same time, of the enhancement and base layers, are the simultaneous encoding pictures. Every time the motion region maps are updated or reset, the motion region recorder 25 causes the motion region maps to be stored in the buffer 20.

The luminance component decoder 26 decodes the luminance components of the pictures. In the embodiment, the luminance component decoder 26 decodes the luminance components in accordance with H.265, like the base layer decoder 22. Thus, a detailed description of a decoding process by the luminance component decoder 26 is omitted. If the video image decoding device 2 conforms to another coding standard, the luminance component decoder 26 decodes the luminance components in accordance with the other coding standard to which the video image decoding device 2 conforms.

The luminance component decoder 26 outputs the decoded luminance components to the synthesizer 27.

The synthesizer 27 synthesizes a decoded luminance component, decoded color-difference components of the base layer, and decoded color-difference components of the enhancement layer for each of the pictures, thereby reproducing the pictures.

In the embodiment, the synthesizer 27 synthesizes the luminance components and color-difference components of the simultaneous encoding pictures of the enhancement layer with each other, thereby reproducing the pictures. The synthesizer 27 synthesizes, for each of the pictures other than the simultaneous encoding pictures, blocks included in a motion region of a luminance component of the target picture and color-difference components of the target picture of the base layer with color-difference components of an immediately preceding simultaneous encoding picture of the enhancement layer, thereby reproducing the pictures. The synthesizer 27 identifies a block included in a motion region based on the motion region maps read from the buffer 20. In addition, the synthesizer 27 references the time information added to the encoded data of the color-difference components of the layers and indicating the display time and the like, and determine that the pictures, each of which includes color-difference components, to be displayed at the same time, of the enhancement and base layers, are the simultaneous encoding pictures.

Figure 7:
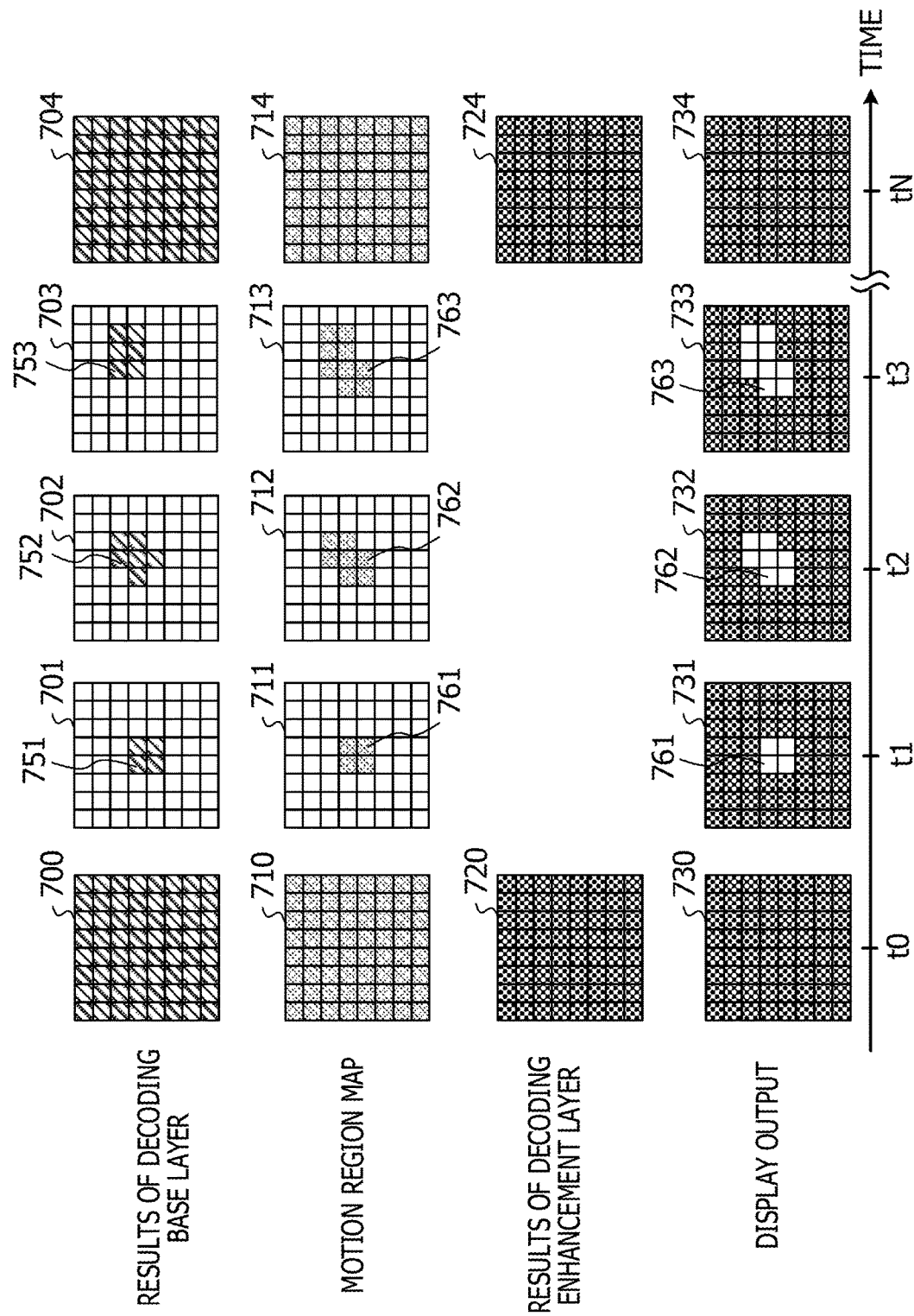
FIG. 7 is an explanatory diagram related to the synthesis of color-difference components.

FIG. 7 is an explanatory diagram related to the synthesis of color-difference components.

In FIG. 7, an abscissa indicates time. In an example illustrated in FIG. 7, a picture at time t0 and a picture at time tN are simultaneous encoding pictures. In addition, each of rectangular regions indicates a color-difference components of a single picture. In order to make it easy to compare the positions of blocks of the base layer with the positions of blocks of the enhancement layer, color-difference components of the base layer and motion region maps are illustrated in an enlarged manner based on the enhancement layer.

Since blocks included in a color-difference component 700 of the base layer is already subjected to the intra-predictive coding at time t0, all blocks are decoded at time t0. At time t0, a motion region map 710 is reset and does not include a motion region. At time t0, a color-difference component 720 of the enhancement layer is also decoded. The color-difference component 720 of the enhancement layer is a color-difference component 730 of a picture to be reproduced.

Next, at time t1, blocks included in a region 751 within a color-difference component 701 of the base layer are subjected to the non-skip encoding. In this case, in a motion region map 711, the region 751 is recorded as a motion region 761. Then, a color-difference component 731 of a picture at time t1 is obtained by replacing a region included in the color-difference component 720 of the enhancement layer at time t0 and corresponding to the motion region 761 with the motion region 761 of the enlarged color-difference component 701 of the base layer at time t1 in the color-difference component 720 of the enhancement layer at time t0.

Similarly, at time t2, blocks included in a region 752 within a color-difference component 702 of the base layer are already subjected to the non-skip encoding. In this case, a region 762 that is a group of the regions 751 and 752 is recorded as a motion region in a motion region map 712. Then, a color-difference component 732 of a picture at time t2 is obtained by replacing a region included in the color-difference component 720 of the enhancement layer at time t0 and corresponding to the motion region 762 with the motion region 762 of the enlarged color-difference component 702 of the base layer at time t2 in the color-difference component 720 of the enhancement layer at time t0.

At time t3, blocks included in a region 753 within a color-difference component 703 of the base layer are already subjected to the non-skip encoding. In this case, a region 763 that is a group of the regions 751, 752, and 753 is recorded as a motion region in a motion region map 713. Then, a color-difference component 733 of a picture at time t3 is obtained by replacing a region included in the color-difference component 720 of the enhancement layer at time t0 and corresponding to the motion region 763 with the motion region 763 of the enlarged color-difference component 703 of the base layer at time t3 in the color-difference component 720 of the enhancement layer at time t0.

Since blocks included in a color-difference component 704 of the base layer are already subjected to the intra-predictive encoding at time tN, all blocks are decoded at time tN. At time tN, a motion region map 714 is reset and does not include a motion region. At time tN, a color-difference component 724 of the enhancement layer is a color-difference component 734 of a picture to be reproduced.

The synthesizer 27 synthesizes color-difference components synthesized in the aforementioned manner with a luminance component for each of the pictures, thereby reproducing the pictures. Then, the synthesizer 27 causes the pictures to be displayed on a display screen of a display device (not illustrated) in the order of the pictures to be displayed.

Figure 8:
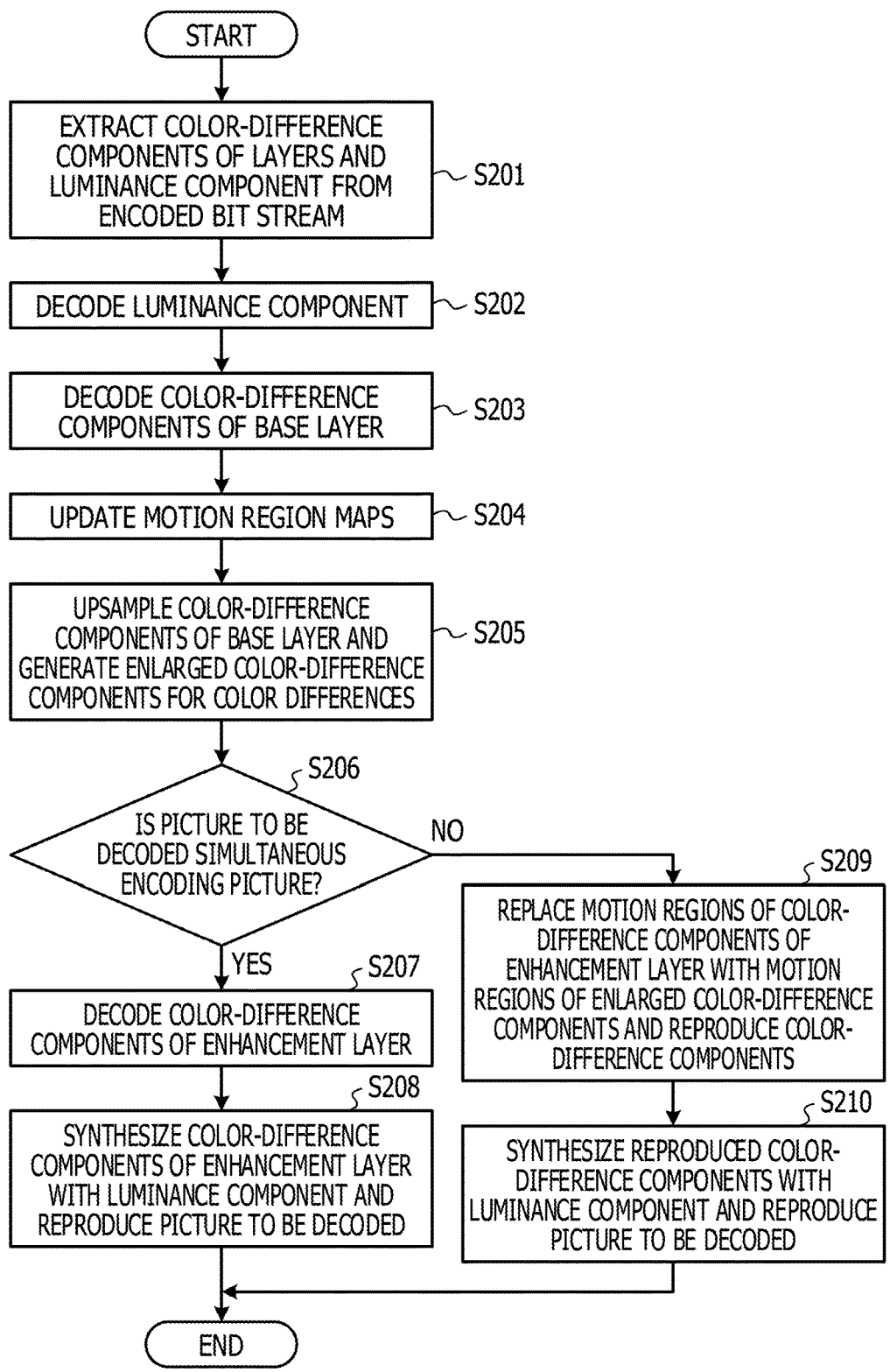
FIG. 8 is an operational flowchart of a video image decoding process.

FIG. 8 is an operational flowchart of the video image decoding process to be executed by the video image decoding device 2. For example, the video image decoding device 2 executes the video image decoding process on each of the pictures of the encoded video image data in accordance with the following operational flowchart.

The separator 21 extracts, from the bit stream including the encoded video image data, encoded data of color-difference components of the base layer and encoded data of a luminance component (in step S201). If a picture to be decoded is a simultaneous encoding picture, the separator 21 extracts encoded data of color-difference components of the enhancement layer (in step S201). Then, the separator 21 outputs the encoded data of the color-difference components of the base layer to the base layer decoder 22 and outputs the encoded data of the color-difference components of the enhancement layer to the enhancement layer decoder 24. In addition, the separator 21 outputs the encoded data of the luminance component to the luminance component decoder 26.

The luminance component decoder 26 decodes the luminance component of the picture to be decoded (in step S202). In addition, the base layer decoder 22 decodes the color-difference components of the base layer from the encoded data of the picture, to be decoded, of the base layer (in step S203). Then, the base layer decoder 22 notifies the motion region recorder 25 of the positions and range of blocks subjected to the non-skip encoding for each color difference. The motion region recorder 25 updates the motion region maps based on the notified positions and range of the blocks subjected to the non-skip encoding for the color differences (in step S204). In addition, the enlarger 23 upsamples the decoded color-difference components for the color differences, thereby generating enlarged color-difference components (in step S205).

A controller (not illustrated) of the video image decoding device 2 determines whether or not the picture to be decoded is a simultaneous encoding picture (in step S206). If the picture to be decoded is the simultaneous encoding picture (Yes in step S206), the enhancement layer decoder 24 decodes the color-difference components of the enhancement layer (in step S207). Then, the synthesizer 27 synthesizes the color-difference components of the enhancement layer with the luminance component, thereby reproducing the picture to be decoded (in step S208).

If the picture to be decoded is not the simultaneous encoding picture (No in step S206), the synthesizer 27 replaces, for the color differences, motion regions included in the color-difference components of the enhancement layer and indicated in the motion region maps with motion regions included in the enlarged color-difference components of the base layer and located at the same positions as the motion regions (in step S209). Thus, the color-difference components of the picture to be decoded are reproduced. Then, the synthesizer 27 synthesizes the reproduced color-difference components with the luminance component, thereby reproducing the picture to be decoded (in step S210). After S208 or S210, the video image decoding device 2 terminates the video image decoding process. The process of step S202 may be executed in parallel with the processes of steps S203 to S207 and S209.

As described above, the video image encoding device encodes the color-difference components of the enhancement and base layers. The video image decoding device replaces motion regions of color-difference components of an immediately preceding simultaneous encoding picture of the enhancement layer with color-difference components of motion regions of a target picture, thereby reproducing the color-difference components of the target picture. Since the video image encoding device and the video image decoding device execute the encoding and decoding so that the spatial resolution of color-difference components of motion regions with a high acceptable level of degradation of an image quality is lower than the spatial resolution of other regions, the video image encoding device and the video image decoding device may inhibit the degradation of an image quality from being perceived. The video image encoding device and the video image decoding device may change the positions and range of motion regions encoded with low resolution for each of the pictures. In addition, the video image encoding device encodes only the simultaneous encoding pictures among the multiple continuous pictures in the enhancement layer and skips the encoding for regions other than motion regions for each of the pictures in the base layer, thereby reducing the amount of information to be generated due to the encoding. In addition, the video image encoding device and the video image decoding device do not reference components including both color-difference components of the base layer and color-difference components of the enhancement layer upon the encoding and decoding of the color-difference components of the layers. Thus, the video image encoding device and the video image decoding device may encode and decode the pictures without a modification of existing coding standards in which hierarchical coding is defined for spatial resolution.

According to a modified example, the base layer encoder 13 of the video image encoding device 1 may encode the color-difference components of the pictures, excluding the simultaneous encoding pictures, of the base layer while referencing locally decoded images of color-difference components of immediately preceding simultaneous encoding pictures of the same base layer.

Figure 9:
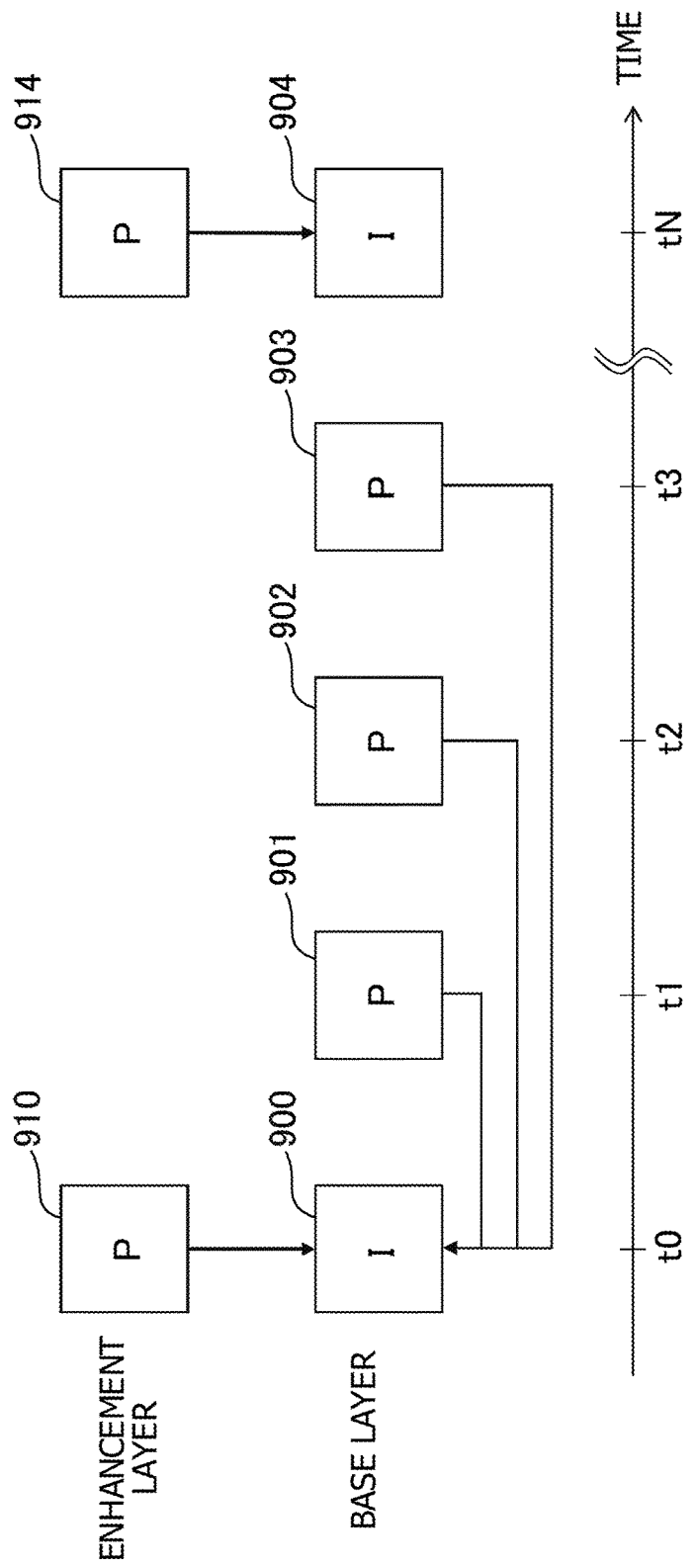
FIG. 9 is a diagram illustrating an example of reference relationships between the base layer and the enhancement layer according to a modified example.

FIG. 9 is a diagram illustrating an example of reference relationships between the base layer and the enhancement layer according to the modified example. In FIG. 9, an abscissa indicates time. Each of rectangular regions indicates color-difference components of a single picture. A picture at time t0 and a picture at time tN are simultaneous encoding pictures. Symbols indicated in blocks indicating color-difference components of pictures indicate predictive coding modes applied. In this example, I indicates the intra-predictive coding mode, and P indicates the inter-predictive coding mode. Arrows indicate reference relationships. The tips of the arrows indicate color-difference components that are reference destinations, while roots of the arrows indicate color-difference components that are reference sources.

As illustrated in FIG. 9, color-difference components 900 of a simultaneous encoding picture at time t0 in the base layer and color-difference components 904 of a simultaneous encoding picture at time tN in the base layer are subjected to the intra-predictive coding. Color-difference components 901 to 903 of pictures at time t1 to t3 that are in the base layer and are not simultaneous encoding pictures are subjected to the inter-predictive coding by referencing locally decoded images of the color-difference components 900 of the preceding simultaneous encoding picture of the same layer (or the base layer). In addition, color-difference components 910 of the simultaneous encoding picture of the enhancement layer at time t0 and color-difference components 914 of the simultaneous encoding picture of the enhancement layer at time tN are subjected to the inter-predictive coding by referencing enlarged locally decoded images of the color-difference components 900 and 904 of the base layer at the same time t0 and tN.

In this modified example, the synthesizer 27 of the video image decoding device 2 may decode color-difference components for the color-differences by replacing motion regions of color-difference components of an immediately preceding simultaneous encoding picture of the enhancement layer with motion regions of enlarged color-difference components of a target picture of the base layer in the same manner as the aforementioned embodiment. In this modified example, for each of the pictures other than the simultaneous encoding pictures, a simultaneous encoding picture immediately preceding the target picture is referenced. Thus, a group of blocks subjected to the non-skip encoding may be treated as a motion region for each of the pictures.

Figure 10:
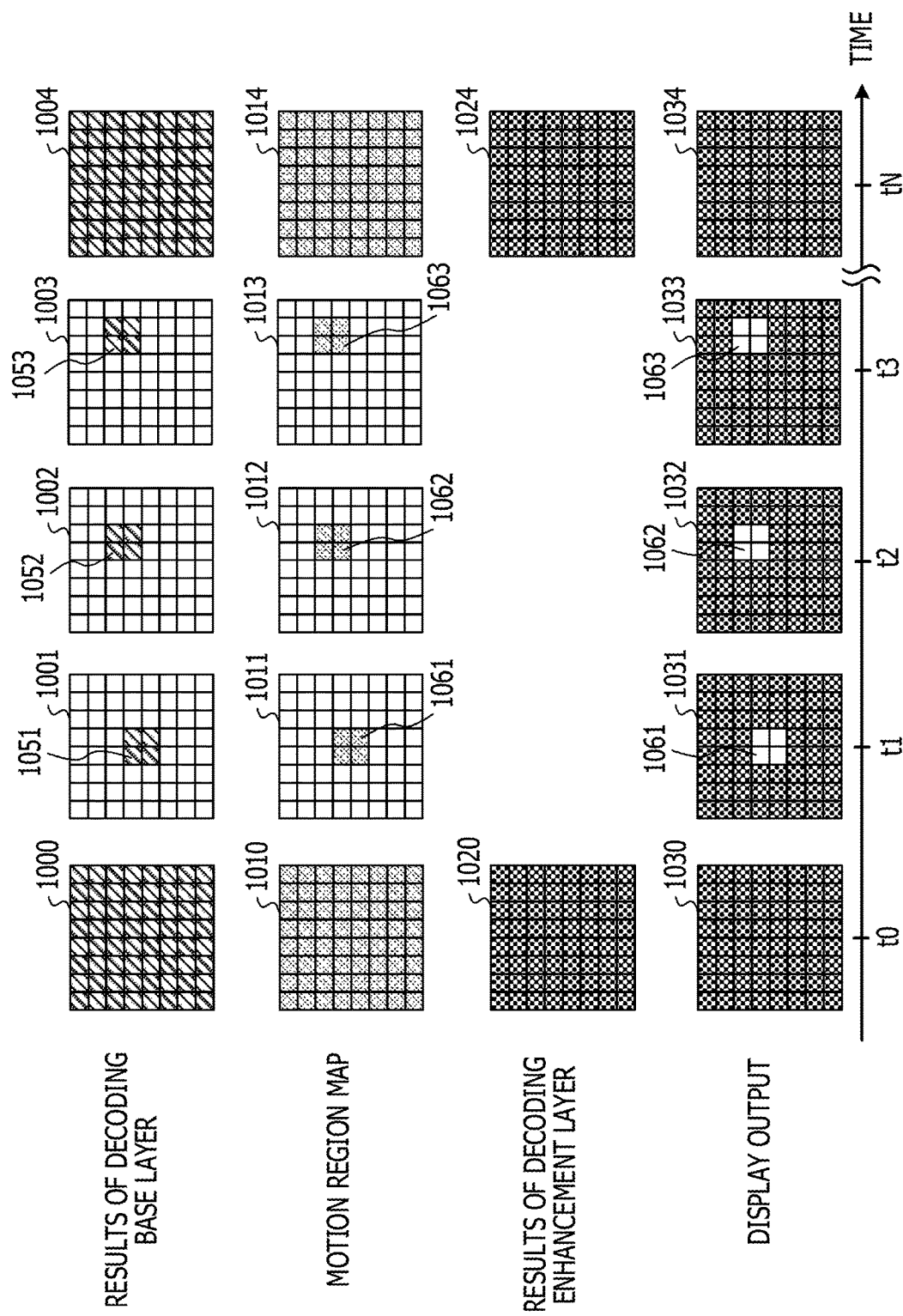
FIG. 10 is an explanatory diagram related to the synthesis of color-difference components according to a modified example.

FIG. 10 is an explanatory diagram related to the synthesis of color-difference components according to the modified example.

In FIG. 10, an abscissa indicates time. In an example illustrated in FIG. 10, a picture at time t0 and a picture at time tN are simultaneous encoding pictures. Each of rectangular regions indicates a color-difference component of a single picture. In order to make it easy to compare the positions of blocks of the base layer with the positions of blocks of the enhancement layer, color-difference components of the base layer and motion region maps are illustrated in an enlarged manner based on the enhancement layer.

Since blocks included in a color-difference component 1000 of the base layer are already subjected to the intra-predictive coding at time t0, all blocks are decoded at time t0. At time t0, a motion region map 1010 is reset and does not include a motion region. At time t0, a color-difference component 1020 of the enhancement layer is also decoded. The color-difference component 1020 of the enhancement layer is a color-difference component 1030 of a picture to be reproduced.

Next, at time t1, blocks included in a region 1051 within a color-difference component 1001 of the base layer are subjected to the non-skip encoding. In this case, a region located at the same position as the region 1051 is recorded as a motion region 1061 in a motion region map 1011. A color-difference component 1031 of a picture at time t1 is obtained by replacing a region included in the color-difference component 1020 of the enhancement layer at time t0 and corresponding to the motion region 1061 with the motion region 1061 of the enlarged color-difference component 1001 of the base layer at time t1 in the color-difference component 1020 of the enhancement layer at time t0.

Similarly, at time t2, blocks included in a region 1052 within the color-difference component 1002 of the base layer are subjected to the non-skip encoding. In this case, a region located at the same position as the region 1052 is recorded as a motion region 1062 in a motion region map 1012. Then, a color-difference component 1032 of a picture at time t2 is obtained by replacing a region included in the color-difference component 1020 of the enhancement layer at time 0 and corresponding to the motion region 1062 with the motion region 1062 of the enlarged color-difference component 1002 of the base layer at time t2 in the color-difference component 1020 of the enhancement layer at time 0.

In addition, at time t3, blocks included in a region 1053 within the color-difference component 1003 of the base layer are subjected to the non-skip encoding. In this case, a region located at the same position as the region 1053 is recorded as a motion region 1063 in a motion region map 1013. Then, a color-difference component 1033 of a picture at time t3 is obtained by replacing a region included in the color-difference component 1020 of the enhancement layer at time t0 and corresponding to the motion region 1063 with the motion region 1063 of the enlarged color-difference component 1003 of the base layer at time t3 in the color-difference component 1020 of the enhancement layer at time t0.

In addition, since blocks included in the color-difference component 1004 of the base layer are already subjected to the intra-predictive coding at time tN, all blocks are decoded at time tN. At time tN, the motion region map 1014 is reset and does not include a motion region. At time tN, the color-difference component 1024 of the enhancement layer is a color-difference component 1034 of a picture to be reproduced.

According to this modified example, the video image decoding device may reduce a region to be replaced with a low-resolution color-difference component.

In addition, according to another modified example, the color-difference components of the enhancement layer may be represented in YCbCr 4:4:4 format, and the color-difference components of the base layer may be represented in YCbCr 4:2:2 format. Alternatively, the color-difference components of the enhancement layer may be represented in YCbCr 4:2:2 format, and the color-difference components of the base layer may be represented in YCbCr 4:2:0 format.

In addition, the base layer decoder 22 of the video image decoding device 2 decodes reduced luminance components of the pictures, and the enhancement layer decoder 24 decodes the luminance components of the simultaneous encoding pictures of the enhancement layer. Then, the synthesizer 27 of the video image decoding device 2 may treat the decoded luminance components of the simultaneous encoding pictures of the enhancement layer as the luminance components of the pictures. In addition, the synthesizer 27 may reproduce, for each of the pictures other than the simultaneous encoding pictures, a luminance component of the target picture by replacing, with a region of an enlarged reduced luminance component of the target picture, a region included in a luminance component of an immediately preceding simultaneous encoding picture of the enhancement layer and located at the same position as the region.

In addition, according to another modified example, the base layer encoder 13 of the video image encoding device 1 may execute the inter-predictive coding on all blocks of the color-difference components of the pictures, excluding the simultaneous encoding pictures, of the base layer. In this case, it is expected that the sum of absolute values of predictive error signals in blocks that are not included in a motion region are 0 or close to 0. Thus, the motion region recorder 25 of the video image decoding device 2 may treat, as the motion region, a group of blocks in which the sum of absolute values of predictive error signals are equal to or larger than a predetermined threshold.

According to still another modified example, the enhancement layer encoder 15 of the video image encoding device 1 may execute the intra-predictive coding on the color-difference components of the simultaneous encoding pictures at certain time intervals. Then, the enhancement layer encoder 15 may execute, for each color difference, the inter-predictive coding on a color-difference component of a picture that is not subjected to the intra-predictive coding, while referencing a locally decoded image of a color-difference component of another immediately preceding picture or a corresponding enlarged locally decoded image.

According to still another modified example, the hierarchical coding according to the aforementioned embodiment or the aforementioned modified examples may be applied to luminance components. Specifically, the reducer 12 of the video image encoding device 1 may generate the reduced luminance components obtained by reducing the resolution of the luminance components of the pictures, and the base layer encoder 13 may encode the reduced luminance components of the pictures. In this case, the base layer encoder 13 executes, for each of the pictures other than the simultaneous encoding pictures, the non-skip encoding on blocks included in a region including a motion with respect to a luminance component of an immediately preceding picture or a luminance component of an immediately preceding simultaneous encoding picture. In addition, the base layer encoder 13 may skip the encoding on other blocks. Furthermore, the enhancement layer encoder 15 may decode an encoded reduced luminance component of a simultaneous encoding picture, reference an enlarged locally decoded image, and encode the original luminance component. In this case, the luminance component encoder 16 of the video image encoding device 1 and the luminance component decoder 26 of the video image decoding device 2 may be omitted.

Figure 11:
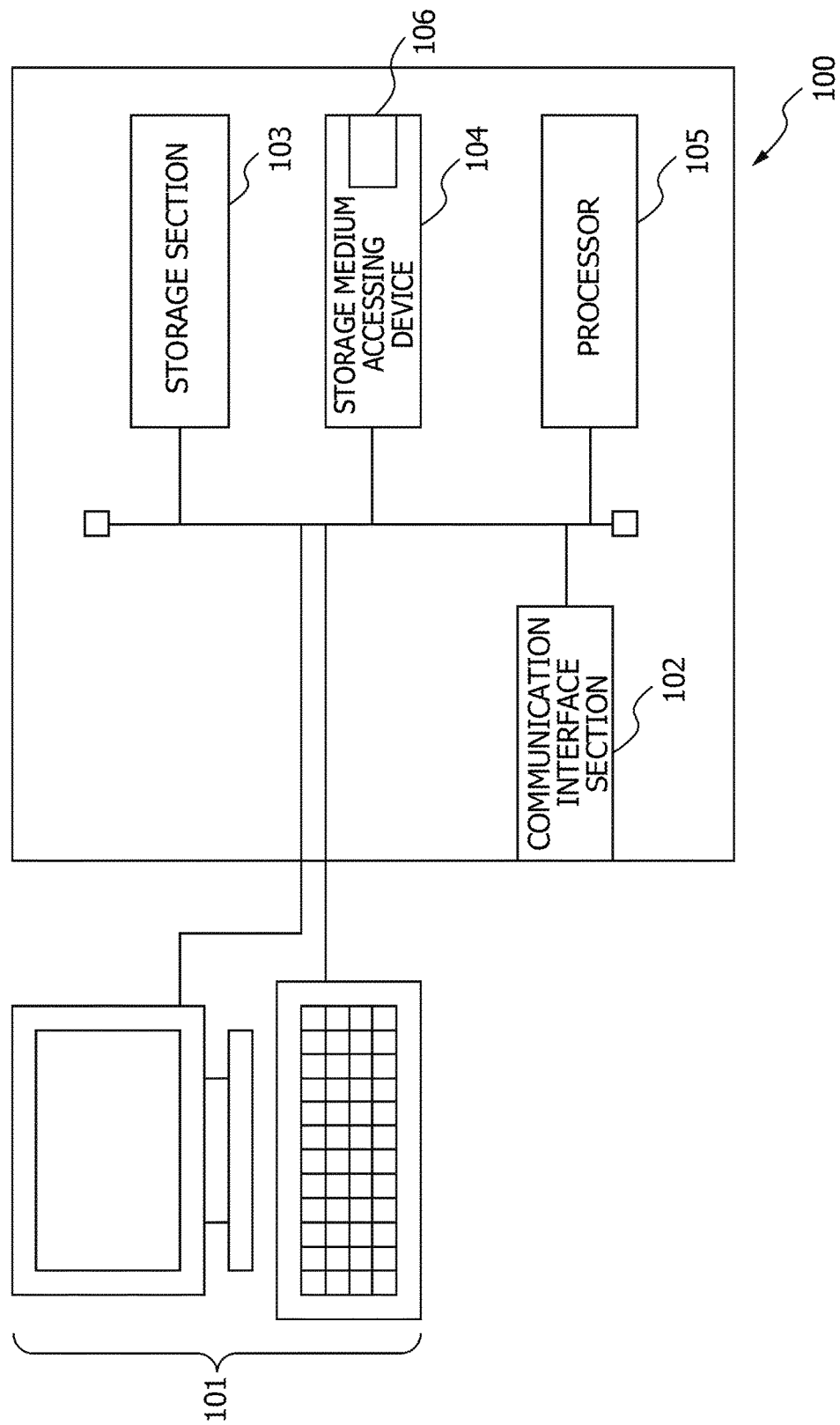
FIG. 11 is a configuration diagram illustrating a computer that operates as the video image encoding device or the video image decoding device.

FIG. 11 is a configuration diagram of a computer that operates as the video image encoding device or the video image decoding device by executing a computer program that achieves the functions of the sections of the video image encoding device or the functions of the sections of the video image decoding device. The computer may be used as a server that generates a screen video image in a system achieving wireless display or VDI or used as a terminal that reproduces an encoded screen video image, for example.

The computer 100 includes a user interface section 101, a communication interface section 102, a storage section 103, a storage medium accessing device 104, and a processor 105. The processor is connected to the user interface section 101, the communication interface section 102, the storage section 103, and the storage medium accessing device 104 via a bus, for example.

The user interface section 101 includes an input device such as a keyboard or a mouse and a display device such as a liquid crystal display, for example. Alternatively, the user interface section 101 may include a device obtained by integrating the input device with the display device. The user interface section 103 outputs, to the processor 105, an operation signal to select video image data to be encoded or video image data to be decoded. The video image data to be encoded or the video image data to be decoded may be determined by an application program executed on the processor 105.

The communication interface section 102 includes a communication interface and a circuit for controlling the communication interface. The communication interface 102 is used to connect the computer 100 to a communication network conforming to a communication standard such as Ethernet (registered trademark), for example. The communication interface section 102 acquires, from another device connected to the communication network, video image data to be encoded and passes the acquired data to the processor 105. In addition, the communication interface section 102 may output encoded video image data received from the processor 105 to the other device via the communication network. Furthermore, the communication interface section 102 may acquire, from the other device connected to the communication network, a bit stream including encoded video image data to be decoded and pass the bit stream to the processor 105.

The storage section 103 includes a readable and writable semiconductor memory and a read-only semiconductor memory, for example. The storage section 103 stores a computer program, to be executed on the processor 105, for executing the video image encoding process or stores a computer program, to be executed on the processor 105, for executing the video image decoding process. The storage section 103 stores data generated during the video image encoding process or the video image decoding process or data generated as a result of the video image encoding process or the video image decoding process.

The storage medium accessing device 104 accesses storage media 106 such as a magnetic disk, a semiconductor memory card, and an optical storage medium, for example. The storage medium accessing device 104 reads a computer program, stored in the storage medium 106 and to be executed on the processor 105, for the video image encoding process or reads a computer program, stored in the storage medium 106 and to be executed on the processor 105, for the video image decoding process and passes the read computer program to the processor 105.

The processor 105 includes any or a combination of a central processing unit (CPU), a graphics processing unit (GPU), and a numerical processor, for example. The processor 105 encodes video image data by executing the computer program for the video image encoding process according to the aforementioned embodiment or one or more of the modified examples. Then, the processor 105 causes the encoded video image data to be stored in the storage section 13 or outputs the encoded video image data to the other device via the communication interface section 102. Alternatively, the processor 105 decodes encoded video image data by executing the computer program for the video image decoding process according to the aforementioned embodiment or one or more of the modified examples. Then, the processor 105 causes the display device of the user interface section 101 to display decoded pictures.

The computer program for the video image encoding process according to the embodiment or one or more of the modified examples and the computer program for the video image decoding process according to the embodiment or one or more of the modified examples may be stored in a computer-readable storage medium and provided. The computer-readable storage medium does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A video image decoding device comprising:
a memory; and
a processor coupled to the memory and configured to
execute a separation process that includes extracting, from encoded video image data including multiple images, first encoded data obtained by encoding reduced images of first images included in the multiple images, and second encoded data obtained by encoding second images included in the multiple images, the first images being continuous with each other in the order of the multiple images to be displayed, the second images being not continuous with each other in the order of the multiple images to be displayed,
execute a first decoding process that includes decoding the reduced images of the first images from the first encoded data,
execute a second decoding process that includes decoding the second images from the second encoded data,
execute a motion region recording process that includes recording, upon the decoding of the reduced images of the first images, first region included in each of the reduced images of the first images, the first region being a first part region of a picture represented by the reduced images, and the first region including motions with respect to the second images immediately preceding the first images, and
execute a synthesis process that includes reproducing the first images included in the multiple images by using first decoded data and second decoded data, the first decoded data being obtained from the first region in the reduced images decoded by the first decoding process, the second decoded data being obtained from a second region in the second images immediately preceding the first images, the second region being a second part region of a second picture represented by the second images, and the second region being different from a third part region of the second picture, wherein location of the third part region corresponds to location of the first region.

2. The video image decoding device according to claim 1,
wherein the first region is associated with a non-skip encoding, the non-skip encoding indicating the first region being encoded by referencing the second images or reduced images of other first images immediately preceding the first images,
wherein fourth region in the reduced images of the first images is not associated with the non-skip encoding, the fourth region being free from a motion with respect to the second images immediately preceding the first images, and
wherein the motion region recording process includes determining the first region including the motions in accordance with whether a region in the reduced images of the first images is associated with the non-skip encoding.

3. The video image decoding device according to claim 2,
wherein the first region corresponds to a region being encoded by referencing the reduced images of the other first images immediately preceding the first images, and
wherein the motion region recording process includes determining the first region including the motions in accordance with sum of encoded regions included in the reduced images of the first images between the first images and the second images immediately preceding the first images.

4. The video image decoding device according to claim 2,
wherein the first region corresponds to a region being encoded by referencing the second images immediately preceding the first images,
wherein the motion region recording process includes determining the first region including the motions whether a region in the reduced images of the first images is being encoded.

5. The video image decoding device according to claim 1,
wherein the first decoding process includes decoding the first images by referencing enlarged decoded images obtained by upsampling the reduced images of the first images.

6. A non-transitory computer-readable storage medium for storing a program that causes a processor to execute a video image decoding process, the video image decoding process comprising:
executing a separation process that includes extracting, from encoded video image data including multiple images, first encoded data obtained by encoding reduced images of first images included in the multiple images, and second encoded data obtained by encoding second images included in the multiple images, the first images being continuous with each other in the order of the multiple images to be displayed, the second images being not continuous with each other in the order of the multiple images to be displayed,
executing a first decoding process that includes decoding the reduced images of the first images from the first encoded data,
executing a second decoding process that includes decoding the second images from the second encoded data,
executing a motion region recording process that includes recording, upon the decoding of the reduced images of the first images, first region included in each of the reduced images of the first images, the first region being a first part region of a picture represented by the reduced images, and the first region including motions with respect to the second images immediately preceding the first images, and
executing a synthesis process that includes reproducing the first images included in the multiple images by using first decoded data and second decoded data, the first decoded data being obtained from the first region in the reduced images decoded by the first decoding process, the second decoded data being obtained from a second region in the second images immediately preceding the first images, the second region being a second part region of a second picture represented by the second images, and the second region being different from a third part region of the second picture, wherein location of the third part region corresponds to location of the first region.

7. A video image encoding device comprising:
a memory; and
a processor coupled to the memory and configured to
execute a reduction process that includes generating reduced images by downsampling first images included in the multiple images of video image data, the first images being continuous with each other in the order of the multiple images to be displayed,
execute a first encoding process that includes encoding the reduced images of the first images, and execute a second encoding process that includes encoding second images included in the multiple images, the second images being not continuous with each other in the order of the multiple images to be displayed, wherein the first encoding process includes associating first region included in each of the reduced images of the first images with non-skip encoding, the first region being a first part region of a picture represented by the reduced images, and the first region including motions with respect to the second images immediately preceding the first images, the non-skip encoding indicating that the first region is being encoded by referencing the first images immediately preceding the first images or the reduced images of other first images immediately preceding the first images, thereby, a video image decoding device is configured to reproduce the first images included in the multiple images by using first decoded data and second decoded data, the first decoded data being obtained from the first region in the reduced images, the second decoded data being obtained from a second region in the second images immediately preceding the first images, the second region being a second part region of a second picture represented by the second images, and the second region being different from a third part region of the second picture, wherein location of the third part region corresponds to location of the first region.

8. The video image encoding device according to claim 7, wherein the processor is further configured to execute an encoding control process that includes setting an interval between two of the second images in accordance with a ratio of sum of regions including motions in the reduced images of the first images between the two of the second images.

* * * * *